United States Patent
Lin et al.

(10) Patent No.: US 10,734,669 B2
(45) Date of Patent: Aug. 4, 2020

(54) RECHARGEABLE BATTERY AND ELECTRODE THEREOF

(71) Applicant: GOLD CARBON CO., LTD., Taoyuan (TW)

(72) Inventors: Yeou-Fu Lin, Taipei (TW); Chien-Te Hsieh, Taoyuan (TW)

(73) Assignee: GOLD CARBON CO., LTD., Taoyuan (TW)

(*) Notice: Subject to any disclaimer, the term of this patent is extended or adjusted under 35 U.S.C. 154(b) by 155 days.

(21) Appl. No.: 16/186,193

(22) Filed: Nov. 9, 2018

(65) Prior Publication Data

US 2019/0386331 A1    Dec. 19, 2019

Related U.S. Application Data

(60) Provisional application No. 62/684,636, filed on Jun. 13, 2018.

(51) Int. Cl.
*H01M 4/02* (2006.01)
*H01M 10/04* (2006.01)
*H01M 4/66* (2006.01)
*H01M 4/76* (2006.01)

(52) U.S. Cl.
CPC ......... *H01M 10/049* (2013.01); *H01M 4/667* (2013.01); *H01M 4/76* (2013.01)

(58) Field of Classification Search
CPC ...................................................... H01M 4/02
See application file for complete search history.

(56) References Cited

U.S. PATENT DOCUMENTS 6,197,445 B1 * 3/2001 Ward .................. H01M 2/0452
                                                               429/163

* cited by examiner

*Primary Examiner* — Jacob B Marks
(74) *Attorney, Agent, or Firm* — Li & Cai Intellectual Property (USA) Office

(57) ABSTRACT

A rechargeable battery and an electrode thereof are provided. The rechargeable battery includes two electrodes and an ionic conduction layer. The ionic conduction layer is disposed between the two electrodes. At least one electrode includes a diffusion-assisting structure facing to the ionic conduction layer. The diffusion-assisting structure has a concaved pattern.

20 Claims, 7 Drawing Sheets

RECHARGEABLE BATTERY AND ELECTRODE THEREOF

CROSS-REFERENCE TO RELATED PATENT APPLICATION

This application claims priority from the U.S. Provisional Patent Application Ser. No. 62/684,636 filed Jun. 13, 2018, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a rechargeable battery and an electrode thereof, and more particularly to a rechargeable battery and an electrode thereof for trickle-charging battery system.

BACKGROUND OF THE DISCLOSURE

In spite of the advancement of technology, electronic devices are still restricted by power cables during charging process, which reduces the convenience of utility. Therefore, technology of the wireless charging is gradually paid attention in expectation of overcoming the defeat of the conventional charging method for electronic devices relying on tangible power cables to transfer energy.

Conventional technology of the wireless charging can be classified into magnetic induction, magnetic resonance, or electromagnetic wave transportation. After omitting the using of power cables, conductive contacts of the electronic devices can be hidden in the electronic devices without being exposing to outside.

Wireless charging by magnetic induction is the most often used wireless charging method. However, as charging by magnetic induction, electronic devices need to contact and be close to charging devices so as to form an induced magnetic field to transfer energy.

Comparing to wireless charging by magnetic induction, wireless charging by magnetic resonance has a longer charging distance. Electronic devices and charging devices can reach a specific resonance frequency by changing the frequency of magnetic field to transfer energy. However, efficiency of wireless charging by magnetic resonance is low and wireless charging by magnetic resonance still has risk to human body.

Comparing to wireless charging by magnetic induction or magnetic resonance, wireless charging by electromagnetic wave transportation has a further longer charging distance. In addition, method of wireless charging by electromagnetic wave transportation can charge many rechargeable batteries at the same time.

Nevertheless, energy provided by electromagnetic wave harvested in environment is low and the internal resistance of the rechargeable battery consumes portion of energy. As a result, the conventional rechargeable batteries still cannot efficiently utilize the electromagnetic wave as an energy source for wireless charging.

SUMMARY OF THE DISCLOSURE

In response to the above-referenced technical inadequacies, the present disclosure provides a rechargeable battery which can be charged by harvesting the electromagnetic wave and can be applied to trickle-charging battery system.

In one aspect, the present disclosure provides a rechargeable battery. The rechargeable battery comprises two electrodes and an ionic transporting layer disposed between the two electrodes. At least one of the two electrodes has a diffusion-assisting structure facing to the ionic transporting layer. The diffusion-assisting structure has a concave pattern.

In one aspect, the present disclosure provides an electrode for rechargeable batteries, comprising a diffusion-assisting structure having a concave pattern.

Therefore, the present disclosure provides technical feature of "the electrode having the diffusion-assisting structure" to increase diffusion paths of ions in the active material layer, increase the diffusion rate of ions in the active material layer, and enhance the utilization ratio of the active material.

Accordingly, larger amount of ions can be stored in the active material layer so the capacity retention ratio of the rechargeable battery and the energy density of the rechargeable battery can also be enhanced; further, total charging time of the rechargeable battery can be shortened. Therefore, the present disclosure has an advantage of quick charging ability.

In addition, due to the increase of the diffusion rate of ions, the rechargeable battery and the electrode thereof can efficiently utilize the energy provided by charging devices and can be applied to trickle-charging battery system. In other words, the rechargeable battery of the present disclosure can be charged by energy provided by harvesting electromagnetic wave and can be acted as a wireless trickle-charging battery.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
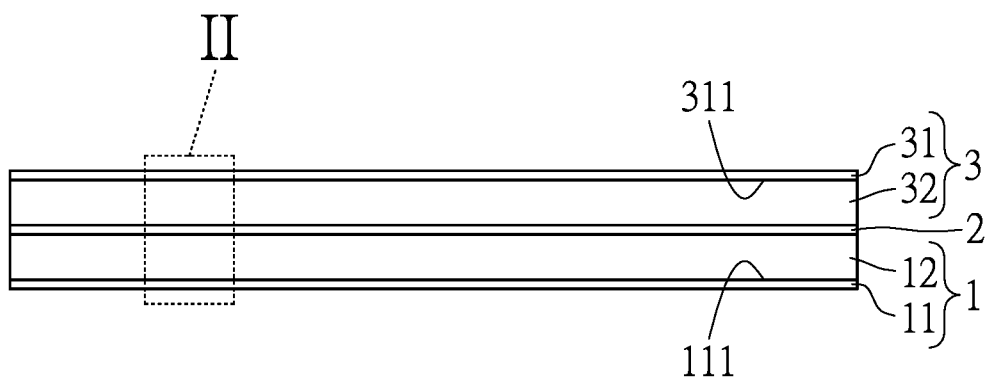
FIG. 1 is a partial side schematic view of a rechargeable battery of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, an embodiment of the present disclosure provides a rechargeable battery. It should be noted that, FIG. 1 only shows electrode assembly of the rechargeable battery for illustration. In the embodiment, the rechargeable battery can be a lithium-ion battery which can be wirelessly charged by harvesting electromagnetic wave.

In the embodiment, the rechargeable battery at least includes two electrodes 1, 3 and an ion transporting layer 2. The ion transporting layer 2 is disposed between the two electrodes 1, 3 to insulate the two electrodes 1, 3.

As shown in FIG. 1, in the embodiment, the electrode 1 has a current collector 11 and an active material layer 12 disposed on the current collector 11. Structure of the electrode 3 is similar to structure of the electrode 1. That is to say, the electrode 3 also has a current collector 31 and an active material layer 32 disposed on the current collector 31.

The current collector 11, 31 usually is a metal conductor to collect current, such as copper plates or aluminum plates. Further, the current collector 11, 31 has an upper surface 111, 311.

The two active material layers 12, 32 are respectively disposed on and cover the upper surface 111, 311 of the two current collectors 11, 31.

Each of the active material layers 12(32) is disposed between the current collector 11(31) and the ion transporting layer 2. The active material layers 12(32) can store or produce electrical energy via chemical reactions.

Take lithium-ion batteries as example, while the rechargeable battery is at a charging process, active material in positive electrode will be oxidized to form lithium ions and producing electrons. The lithium ions will move toward negative electrode by passing through the ion transporting layer 2 and react with active material in the negative electrode to produce lithium-containing compound. Meanwhile, the electrons will flow from the positive electrode toward the negative electrode through external circuit.

While the rechargeable battery is at a discharging process, active material in the negative electrode will be oxidized to form lithium ions and producing electrons. The electrons will flow from the negative electrode toward the positive electrode through external circuit to supply electricity. Meanwhile, the lithium-ions will move toward the positive electrode by passing through the ion transporting layer 2.

Accordingly, the conversion between chemical energy and electrical energy in lithium-ion batteries is processed by chemical reactions. Converting medium of chemical energy inside lithium-ion batteries is lithium ions, while converting medium of electrical energy outside lithium-ion batteries is electrons. Therefore, efficacy of lithium-ion batteries will be influenced by both diffusion rates of lithium ions in electrolyte and active material (i.e. active material in the positive electrode or in the negative electrode) and conductive rates of electrons in active material and electrodes (i.e. positive electrode or negative electrode).

In the embodiment, lithium-ion batteries are taken as example to further illustrate structure and material of the electrode 1, 3. The two electrodes 1, 3 are respectively a positive electrode and a negative electrode.

The active material layer 12 of the positive electrode (electrode 1) includes an active material, a conductive agent, and a binder.

The active material can be a lithium-containing metallic compound. The lithium-containing metallic compound further includes nickel, cobalt, manganese, or iron. In the embodiment, the active material is lithium nickel manganese cobalt oxide ($LiNi_xCo_yMn_zO_2$, abbreviated as LNCM).

Based on the total weight of the active material layer 12, the amount of the active material is ranging from 85 wt % to 97 wt %. In one embodiment, the amount of the active material is ranging from 94 wt % to 96 wt %.

The conductive agent can be carbon black, carbon nanotube, graphene, carbon fiber, or any combination thereof. The conductive agent can provide conductive paths of electrons in the electrode to improve the conductive rate of electrons, which beneficial to transfer electrons from the active material layer 12 to the current collector 11.

Based on the total weight of the active material layer 12, the amount of the conductive agent is ranging from 0.5 wt % to 5 wt %. In a better embodiment, the conductive agent includes carbon black and graphene. The amount of carbon black is ranging from 0.5 wt % to 2.5 wt % and the amount of graphene is larging than 0 wt % and less than 2.5 wt %.

The binder can be polyvinylidene difluoride (PVDF), but not limited thereto. Based on the total weight of the active material layer 12, the amount of the binder is ranging from 2.5 wt % to 10 wt %. In an embodiment, based on the total weight of the active material layer 12, the amount of the binder is ranging from 1 wt % to 5 wt %.

In an embodiment, a thickness of the active material layer 12 of the positive electrode is ranging from 100 μm to 300 μm.

Further, the active material layer 32 of the negative electrode (electrode 3) includes an active material and the active material is graphite.

Formation of the diffusion-assisting structure 121, 321 on a side of the two electrodes 1, 3 can be completed by a tunable slot die coating process. Specifically, the active material layer 12, 32 with the diffusion-assisting structure 121, 321 can be disposed on the current collector 11, 31 directly by a slot die coater. At first, the active material, the conductive agent, and the binder are mixed and formed an electrode slurry. Subsequently, coating paths and parameters of the slot die coater are set according to the concave pattern 121a, 321a. The slot die coater processes the upper surface 111, 311 of the current collector 11, 31 to form the active material layer 12, 32 with the plurality of trenches 1212, 3212.

In other embodiments, the processing of the diffusion-assisting structure 121, 321 can also be subsequent to the formation of the active material layer 12, 32. Specifically, the electrode slurry containing the active material, the conductive agent, and the binder can be directly coated on the current collector 11, 31 to form a plat and solidified electrode slurry. Then, carving paths and parameters of a laser engraving machine are set according to the concave pattern 121a, 321a to carve the plat and solidified electrode slurry. The plat and solidified electrode slurry will be carved and form the plurality of trenches 1212, 3212 to obtain the diffusion-assisting structure 121, 321.

Figure 2:
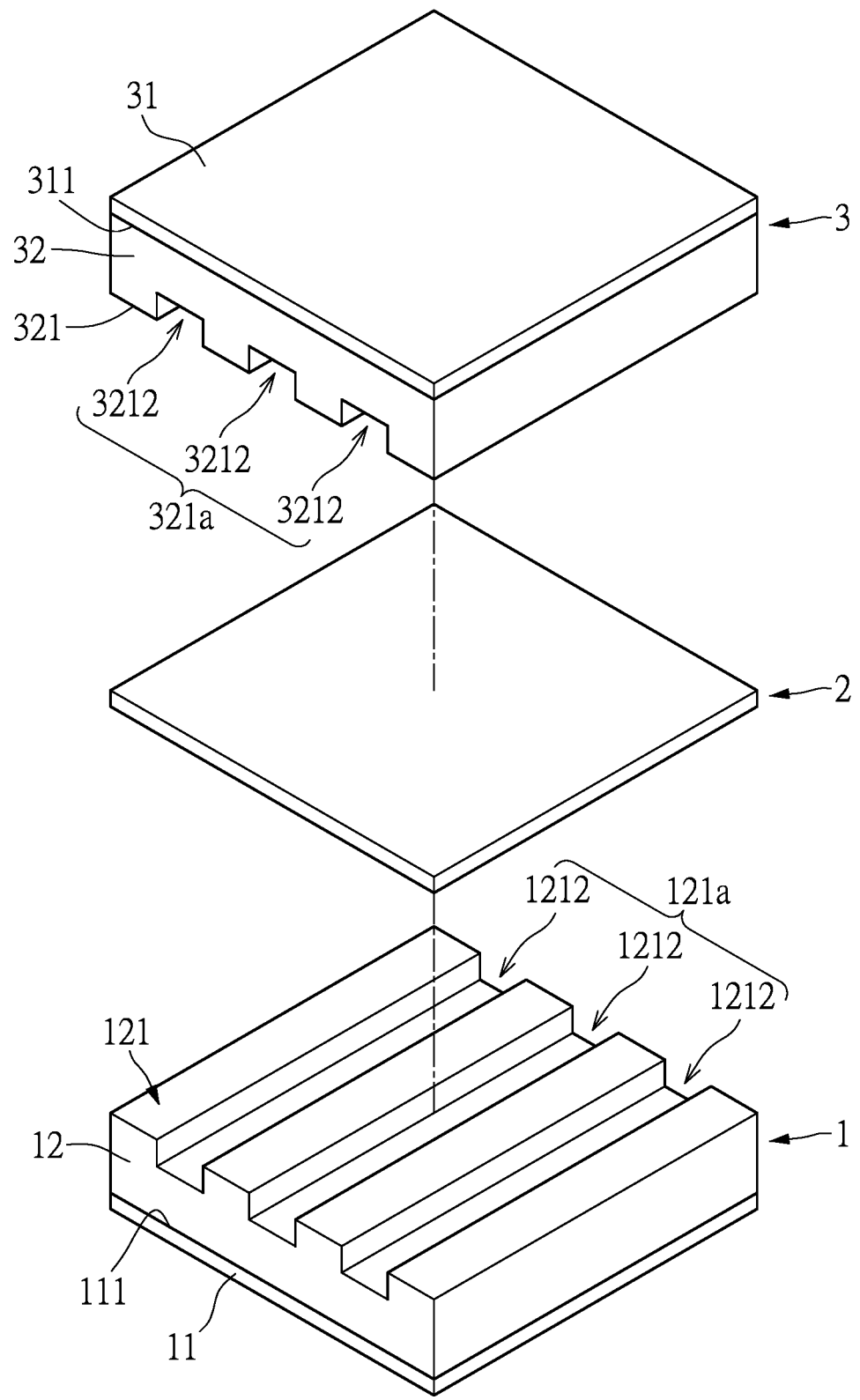
FIG. 2 is an enlarged exploded perspective schematic view of section II of FIG. 1.

Referring to FIG. 2, in the embodiment, at least one of the two electrodes 1, 3 has the diffusion-assisting structure 121, 321 on a surface facing to the ion transporting layer 2. In other words, at least one of the active material layers 12, 32 has the diffusion-assisting structure 121, 321.

The concave pattern 121a of the embodiment in FIG. 2 is shown and illustrated on the condition that both the positive electrode and the negative electrode (the electrodes 1, 3) have the diffusion-assisting structure 121, 321. However, in another embodiment, only one of the positive electrode and the negative electrode (the electrodes 1, 3) has the diffusion-assisting structure 121, 321, while the other of the positive electrode and the negative electrode has a flat surface facing to the ion transporting layer 2.

Referring to FIG. 2, the active material layer 12, 32 has a diffusion-assisting structure 121, 321 facing to the ion transporting layer 2. The diffusion-assisting structure 121, 321 is a concave-convex structure to increase a surface area of the active material layer 12, 32. Therefore, the diffusion-assisting structure 121, 321 can provide more diffusion paths of ions to increase the diffusion rate of ions in the active material layers 12, 32 and enhance the utilization ratio of the active material.

The diffusion-assisting structure 121, 321 has a concave pattern 121a, 321a. Specifically, parts of a surface of the active material layer 12, 32 are depressed to form the concave pattern 121a, 321a.

The electrode 1 is taken as an example to illustrate details below of the diffusion-assisting structure 121.

Figure 3:
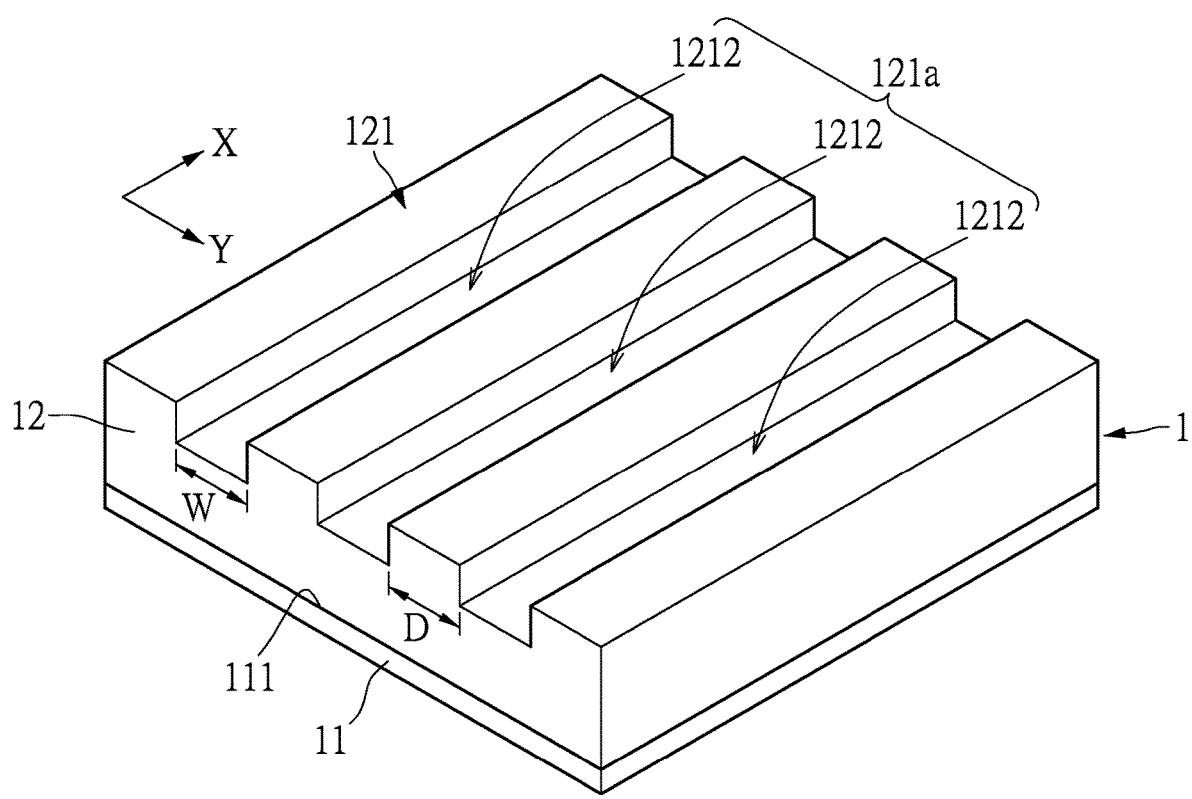
FIG. 3 is a perspective schematic view of an electrode according to an embodiment of the present disclosure.

Referring to FIG. 3, the diffusion-assisting structure 121 of the embodiment includes the plurality of trenches 1212. The plurality of trenches 1212 are formed by being depressed from the parts of the surface of the active material layer 12 toward the current collector 11. Therefore, the plurality of trenches 1212 constitutes the concave pattern 121a.

In the embodiment, each of the trenches 1212 extends from an end surface of the active material layer 12 to another end surface of the active material layer 12. In an embodiment, each of the trenches 1212 has a width of 50 μm and a depth of 50 μm.

However, appearance of the concave pattern 121a is not limited as shown in FIG. 3. In other embodiments, the concave pattern 121a is not necessary composed of the plurality of trenches 1212. The concave pattern 121a can be composed of circular recesses or by both the circular recesses and the plurality of trenches 1212. As long as the diffusion-assisting structure 121 can increase the surface area of the active material layer 12, the specific configuration of the diffusion-assisting structure 121 or the specific appearance of the concave pattern 121a are not limited thereto.

As shown in FIG. 3, the plurality of trenches 1212 extend along a first direction X and are arranged along a second direction Y. The plurality of trenches 1212 are respectively independent and do not communicate with one another.

The arrangement of the plurality of trenches 1212 is not limited thereto. In other embodiments, the plurality of trenches 1212 can intersect with or be perpendicular to, which causes the plurality of trenches 1212 communicate with one another.

Referring to FIG. 3, each of the plurality of trenches 1212 has the same width W in the second direction Y. Further, each two adjacent trenches 1212 of the plurality of trenches 1212 are spaced apart by a predetermined distance D. All the predetermined distances D are the same. In the embodiment, the width W of each of the plurality of trenches 1212 and the predetermined distance D are the same. That is to say, in the embodiment in FIG. 3, ratio of the predetermined distance D to the width W of each of the plurality of trenches 1212 is 1:1. In the embodiment, the predetermined distance D and the width W of each of the plurality of trenches 1212 are both 50 μm.

In other embodiments, the width W of each of the plurality of trenches 1212 can be different from the predetermined distance D. In other words, the width W of each of the plurality of trenches 1212 can be larger than or smaller than the predetermined distance D. Further, the ratio R (D/W) of the predetermined distance D to the width W of each of the plurality of trenches 1212 is ranging from 1 to 9.

Figure 4:
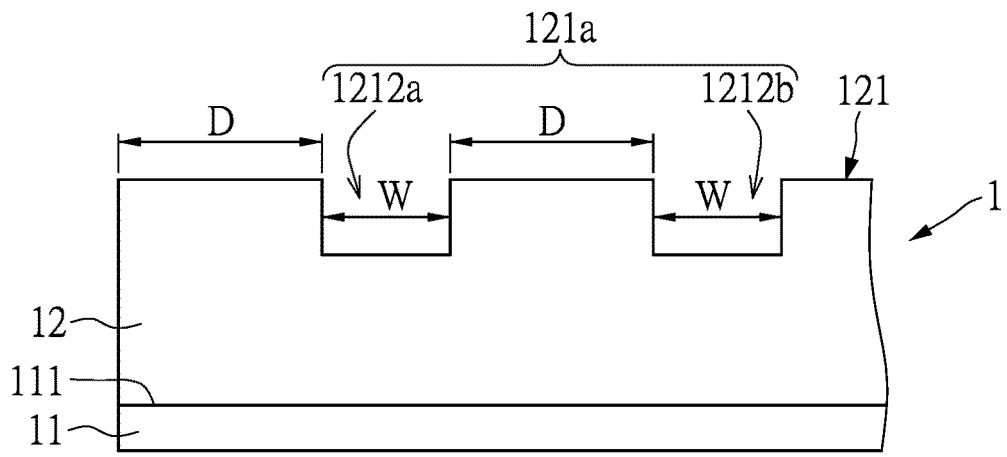
FIG. 4 is a side schematic view of the electrode according to another embodiment of the present disclosure.

In addition, referring to FIG. 4, the width W of each of the plurality of trenches 1212 is smaller than the predetermined distance D.

Figure 5:
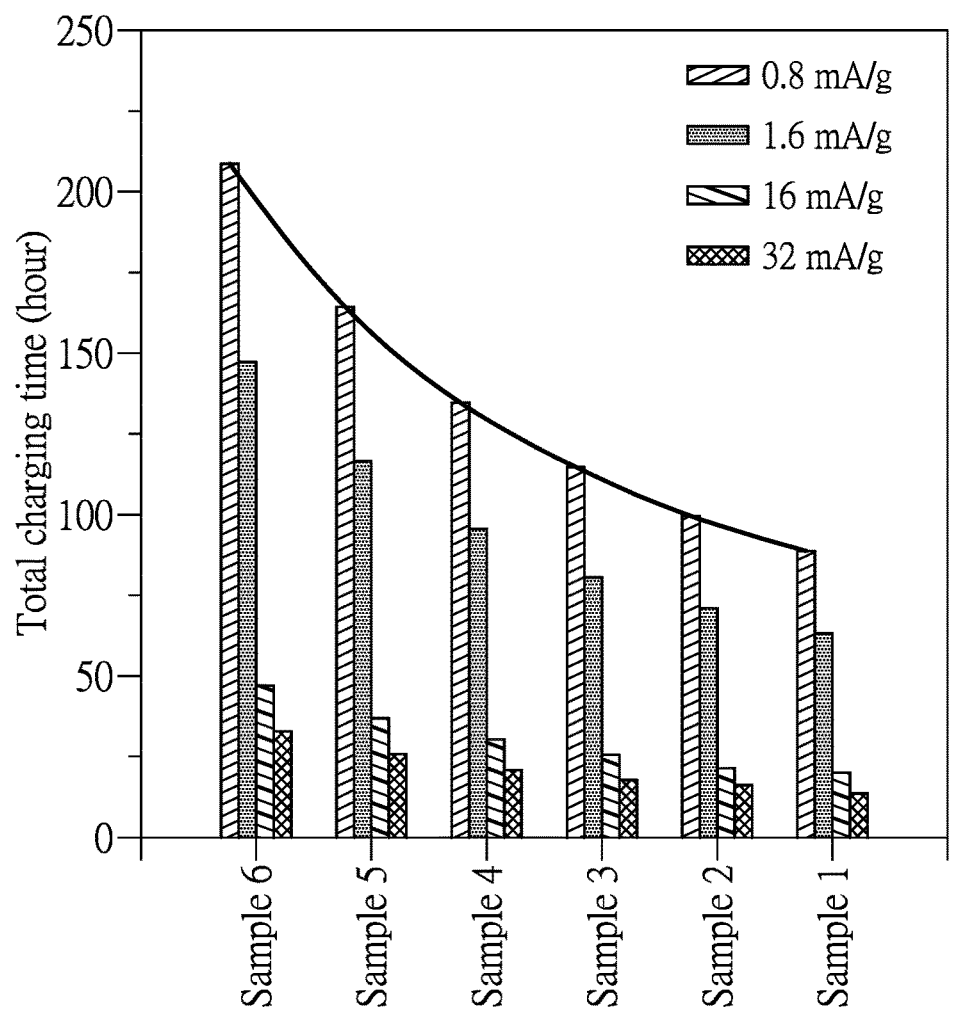
FIG. 5 is a bar chart of total charging time for the rechargeable batteries of samples 1 to 6 to be fully charged at different charging current intensities.

Referring to FIG. 5, FIG. 5 depicts total charging time of the rechargeable batteries of different embodiments to be fully charged at different charging current intensities. The rechargeable batteries with different conditions (samples 1 to 6) are prepared. Materials of the two electrodes 1, 3 of samples 1 to 6 are the same. Among samples 1 to 6, only the two electrodes 1, 3 of sample 6 do not have the diffusion-assisting structure 121, while the rechargeable batteries of samples 1 to 5 have the diffusion-assisting structures 121 with different conditions. Specifically, the ratios R of the predetermined distance D to the width W in the rechargeable batteries of samples 1 to 5 are different.

More specifically, all the diffusion-assisting structures 121 of samples 1 to 5 contain the plurality of trenches 1212 which are arranged in parallel. In samples 1 to 5, the ratios R of the predetermined distance D to the width W in the rechargeable batteries respectively are 1:1 (sample 1), 6:4 (sample 2), 7:3 (sample 3), 8:2 (sample 4), and 9:1 (sample 5). The "fully charged" is defined as charging the rechargeable battery at a charging rate of 0.05 C-rate (substantially equal to 0.8 mA/g) and a difference between a voltage of the rechargeable battery and the maximum voltage of the rechargeable battery being smaller than 50 mV.

Based on results of the FIG. 5, comparing to the rechargeable battery of sample 6 without the diffusion-assisting structure 121, the rechargeable batteries of samples 1 to 5 have a shorter total charging time to be fully charged. Accordingly, the diffusion-assisting structure 121 can increase the diffusion paths of ions in the active material layer 12 to increase the diffusion rate of ions in the active material layer 12; thereby, ions actually participating in energy conversion can be increased and problems of long changing time caused by slow diffusion rate of ions can be alleviated.

It should be notable that the total charging time of the rechargeable batteries of samples 1 to 5 are obviously shorter than the total charging time of the rechargeable battery of sample 6 as being charged at a low constant current density (0.8 mA/g). Therefore, after enhancing the diffusion rate of ions in the active material layer 12, the problem of long total charging time of the rechargeable batteries charging at low current density can be improved.

Further comparing results of the rechargeable batteries of samples 1 to 5, when the ratio R of the predetermined distance D to the width W is ranging from 1 to 9, ratio R has a tendency of being in a positive correlation with the total charging time of the rechargeable batteries. That is to say, the smaller the value of the ratio R is, the shorter the total charging time of the rechargeable battery is. Furthermore, when the charging current density is smaller, the positive correlation of the ratio R to the total charging time is more obvious.

Therefore, regulating the ratio R of the diffusion-assisting structure 121 can further enhance the diffusion rate of ions in the active material layer 12 and shorten the total charging time at a low charging current density (0.8 mA/g).

Figure 6:
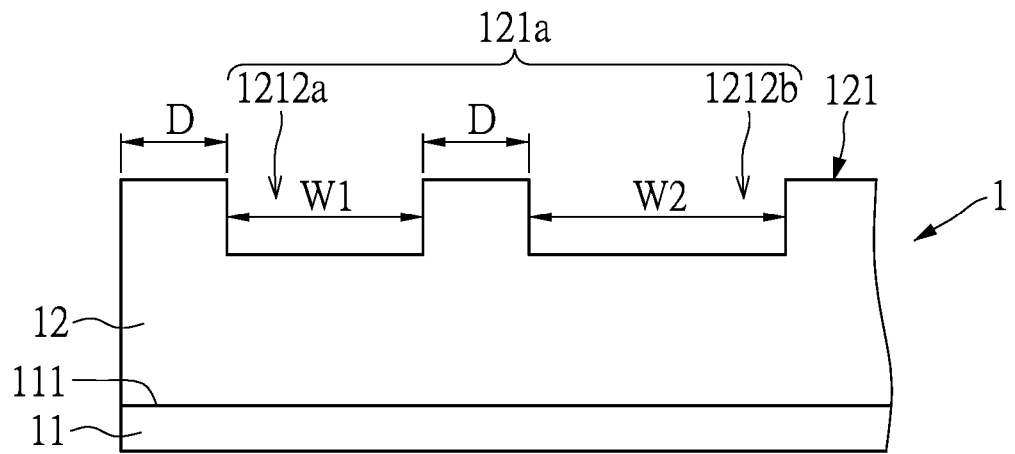
FIG. 6 is a side schematic view of the electrode according to still another embodiment of the present disclosure.

Further, widths W of any two trenches of the plurality of trenches 1212 can be different. Referring to FIG. 6, the predetermined distances D among the plurality of trenches are the same but at least two of the plurality of trenches 1212a, 1212b respectively have different widths W1, W2.

Figure 7:
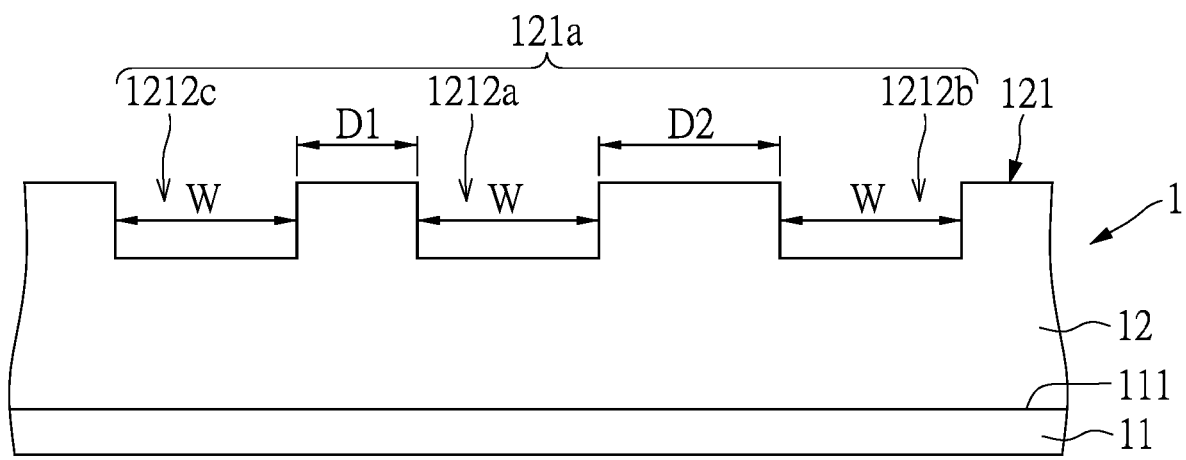
FIG. 7 is a side schematic view of the electrode according to other embodiment of the present disclosure.

In another embodiment, the predetermined distances D among the plurality of trenches 1212 can be different. Referring to FIG. 7, the plurality of trenches 1212a-c all have the same width W. One of the trenches 1212a is spaced apart from an adjacent trench 1212c by a first predetermined distance D1 and is spaced apart from another adjacent trench 1212b by a second predetermined distance D2. The first predetermined distance D1 and the second predetermined distance D2 are different.

Figure 8:
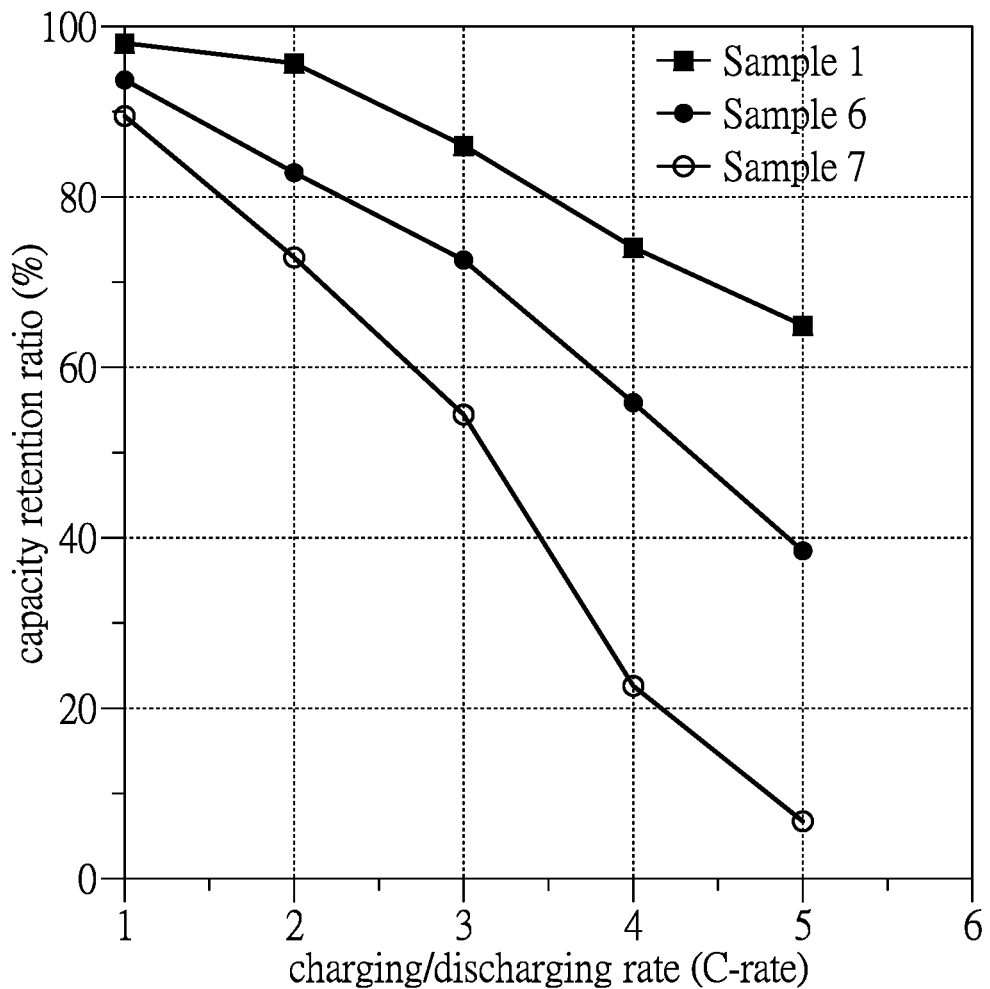
FIG. 8 is a relation chart of capacity retention ratio of the rechargeable batteries of samples 1, 6, and 7 at different charging/discharging rates.
Figure 9:
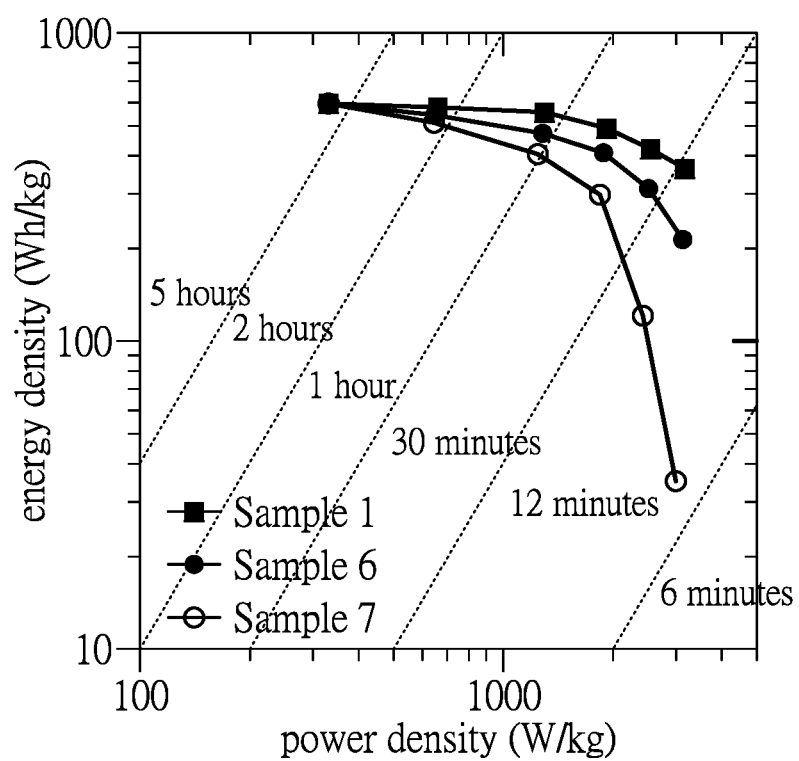
FIG. 9 is a relation chart of energy densities of the rechargeable batteries of samples 1, 6, and 7 at different power densities.

Furthermore, referring to FIG. 8 and FIG. 9, the rechargeable battery of samples 1, 6, and another sample 7 are processed charging/discharging test and testing results are shown in FIG. 8 and FIG. 9.

Samples 6 and 7 do not have the diffusion-assisting structure 121. Further, the active material layers 12 of the electrodes 1 in samples 1 and 6 have the conductive agent, while the active material layer 12 of the electrode 1 in sample 7 does not have the conductive agent.

Referring to FIG. 8, the capacity retention ratio of the rechargeable batteries of samples 1, 6, and 7 at different charging/discharging rates are shown in FIG. 8. When the charging/discharging rate is increase (i.e. charging at a high current density in short time), converting ability of electrical energy of the rechargeable battery is restricted by both of the diffusion rate of ions in the active material layer 12 and the conductive rate of electrons in the active material layer 12. If the charging/discharging rate is too high, converting ratio between electrical energy and chemical energy will be decreased causing the capacity retention ratio of the rechargeable battery being decreased.

As shown in FIG. 8, the rechargeable battery with the diffusion-assisting structure 121 (sample 1) has a higher capacity retention ratio than the rechargeable battery without the diffusion-assisting structure 121 (sample 6). The higher capacity retention ratio means that the diffusion rate of ions in the electrode is higher, hence larger amount of ions can enter the electrode 1.

Therefore, the diffusion-assisting structure 121 of the present disclosure indeed can increase the diffusion paths of ions and increase the diffusion rate of ions in the active material layer 12. An increase of the diffusion rate of ions in the active material layer 12 can enhance the utilization ratio of the active material and increase a conversion ratio between electrical energy and chemical energy to make the rechargeable battery have a higher capacity retention ratio.

Furthermore, according to results of the rechargeable batteries of samples 6 and 7, the rechargeable battery including the conductive agent (sample 6) has a higher energy density than the rechargeable battery without the conductive agent (sample 7).

According to mentioned above, the addition of the conductive agent can increase the conductive paths of electrons and increase the conductive rate of electrons in the active material layer 12. An increase of the conductive rate of electrons in the active material layer 12 can reduce internal resistance of the rechargeable batteries and decrease energy consumption inside the rechargeable batteries to increase the energy retention ratio of the rechargeable battery.

It should be notable that the differences of the energy densities among the rechargeable battery of samples 1, 6, and 7 are obvious as charging at high charging/discharging power density (5 C-rate). In other words, the rechargeable batteries in present disclosure can improve the defeats existed in conventional rechargeable battery of being unsuitable to charging/discharging at a high charging/discharging ratio.

Referring to FIG. 9, FIG. 9 is a relation chart of energy densities able to be converted of the rechargeable batteries of samples 1, 6, and 7 at different discharging time, different power densities. When being discharged at a higher discharging ratio (i.e. discharging at a short time, such as 6 minutes, 6 C), the power density of the rechargeable battery is increased but the energy density of the rechargeable battery is decreased, which represents that the converting ability of electrical energy of the rechargeable battery will be restricted by the diffusion rate of ions and conductive rate of electrons of the active material layer 12. When being discharged at a lower discharging ratio (i.e. discharging at a short time, such as 5 hours, 0.2 C), the power density of the rechargeable battery is decreased but the energy density of the rechargeable battery is increased. According to results of the rechargeable battery of samples 1 and 6, the rechargeable battery with the diffusion-assisting structure 121 (sample 1) has a high energy density than the rechargeable battery without the diffusion-assisting structure 121 (sample 6).

Therefore, the diffusion-assisting structure 121 indeed can increase diffusion paths of ions in the active material layer 12 and increase the diffusion rate of ions in the active material layer 12. When the diffusion rate of ions in the active material layer 12 is increased, the utilization ratio of the active material in the rechargeable battery and the converting ratio between the electrical energy and chemical energy will be enhanced to make the rechargeable battery have a higher energy density.

According to the results of samples 6 and 7, the rechargeable battery added the conductive agent (sample 6) has a higher energy density than the rechargeable battery without being added the conductive agent (sample 7).

Therefore, the addition of the conductive agent in the active material layer 12 of the electrode 1 can increase the conductive paths of electrons and the conductive rate of electrons in the active material layer 12. When the conductive rate of electrons in the active material layer 12 is increased, the internal resistance of the rechargeable battery and the energy consumption inside the rechargeable battery can be decreased to enhance the energy density of the rechargeable battery.

It should be noted that differences of energy density among the rechargeable batteries of samples 1, 6, and 7 is more obvious as charging/discharging at a high power density (about 1200 W/kg). That is to say, the rechargeable battery of the present disclosure can improve the defect of the unsuitability to charge/discharge at high power density of conventional rechargeable batteries.

According to the testing results mentioned above, the diffusion-assisting structure 121 can increase the diffusion paths of ions and further increase the diffusion rate of ions in the active material layer 12 of the electrode 1. Furthermore, regulating the appearance and the dimension scale of the concave area of the diffusion-assisting structure 121 also can increase the diffusion paths of ions and the diffusion rate of ions in the active material layer 12.

Further, according to the result of the rechargeable battery of samples 6 and 7, the addition of the conductive agent in the active material layer 12 of the electrode 1 can increase the conductive paths of electrons in the active material layer 12 and the conductive rate of electrons in the active material layer 12.

The increase of the diffusion rate of ions in the active material layer 12 and the conductive rate of electrons in the active material layer 12 can improve the problem of low charging efficiency of the conventional rechargeable batteries being charged at a high charging/discharging ratio or at a high power density. Specifically, the rechargeable battery of the present disclosure has a higher capacity retention ratio, a higher power density, and a shorter total charging time.

Further, due to the higher diffusion rate of ions in the active material layer 12 and the higher conductive rate of electrons in the active material layer 12, the utilization ratio of the active material can be enhanced. Therefore, the rechargeable battery of the present disclosure can be charged by lower energy, even though the low-energy electromagnetic wave in environment can be utilized as a charging energy source. Accordingly, the rechargeable battery can be wirelessly charged by electromagnetic wave transportation and can be acted as wireless trickle-charging batteries.

In conclusion, the rechargeable battery and the electrode thereof of the present disclosure has the technical feature of "one of the two electrodes 1, 3 having a diffusion-assisting structure 121" to increase the diffusion paths of ions in the active material layer 12 and increase the diffusion rate of ions in the active material layer 12 causing the enhancement of property of the rechargeable batteries.

The rechargeable battery and the electrode thereof of the present disclosure has the technical feature of "addition of the conductive agent in the active material layer 12" to help electrons be transferred to current collector 11, to increase conductive paths of electrons, and to increase the conductive rate of electrons in the active material layer 12 causing the enhancement of property of the rechargeable batteries.

Accordingly, due to the increases of the diffusion rate of ions in the active material layer 12 and the conductive rate of electrons in the active material layer 12, the rechargeable battery can be charged or discharged at a higher charging/discharging ratio or at a higher power density. So, the rechargeable battery of the present disclosure is suitable for quick charging/discharging and has a shorter total charging time to be fully charged, a higher capacity retention ratio, and a higher power density.

Further, because the diffusion rate of ions and conductive rate of electrons in the active material layer 12 are high enough, the conversion efficiency between electrical energy and chemical energy of the rechargeable battery will not be too low caused by low diffusion rate of ions and low conductive rate of electrons.

Accordingly, even though the energy provided by the charging device is low, the rechargeable battery of the present disclosure still can store energy by converting chemical energy into electron efficiently. Further, the rechargeable battery of the present disclosure can act as a wireless trickle-charging battery and apply to wireless trickle-charging system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A rechargeable battery, comprising:
   two electrodes; and
   an ionic transporting layer disposed between the two electrodes;
   wherein at least one of the two electrodes has a diffusion-assisting structure facing to the ionic transporting layer, and the diffusion-assisting structure has a concave pattern.

2. The rechargeable battery according to claim 1, wherein the concave pattern includes a plurality of trenches extending along a first direction and arranged along a second direction.

3. The rechargeable battery according to claim 2, wherein widths of the plurality of trenches in the second direction are the same.

4. The rechargeable battery according to claim 2, wherein at least two widths of the plurality of trenches in the second direction are different.

5. The rechargeable battery according to claim 2, wherein each two adjacent trenches of the plurality of trenches are spaced apart by a predetermined distance in the second direction, and ratios of the predetermined distance to width of each of the plurality of trenches are ranging from 1 to 9.

6. The rechargeable battery according to claim 5, wherein the predetermined distance and the widths of the plurality of trenches are the same.

7. The rechargeable battery according to claim 1, wherein the two electrodes both have the diffusion-assisting structure.

8. The rechargeable battery according to claim 1, wherein one of the two electrodes has the diffusion-assisting structure and the other of the two electrodes has a flat surface facing to the ionic transporting layer.

9. The rechargeable battery according to claim 8, wherein the electrode having the diffusion-assisting structure is a positive electrode.

10. The rechargeable battery according to claim 1, wherein at least one of the two electrodes includes a current collector and an active material layer, the active material layer is disposed between the current collector and the ionic transporting layer, and the active material layer has the diffusion-assisting structure.

11. The rechargeable battery according to claim 10, wherein the current collector has an upper surface connected with the active material layer, and the active material layer fully covers the upper surface.

12. The rechargeable battery according to claim 10, wherein the active material layer includes a conductive agent, the conductive agent includes carbon black, carbon nanotube, graphene, carbon fiber, or any combination thereof, and a concentration of the conductive agent in the active material layer is ranging from 0.5 wt % to 5 wt %.

13. The rechargeable battery according to claim 1, wherein the rechargeable battery is a wireless trickle-charging battery.

14. An electrode for rechargeable batteries, comprising a diffusion-assisting structure having a concave pattern.

15. The electrode for rechargeable batteries according to claim 14, wherein the concave pattern includes a plurality of trenches extending along a first direction and arranged along a second direction.

16. The electrode for rechargeable batteries according to claim 15, wherein widths of the plurality of trenches in the second direction are the same.

17. The electrode for rechargeable batteries according to claim 15, wherein each two adjacent trenches of the plurality of trenches are spaced apart by a predetermined distance, and ratios of the predetermined distance to width of each of the plurality of trenches in the second direction are ranging from 1 to 9.

18. The electrode for rechargeable batteries according to claim 14, further comprising a current collector and an active material layer, the active material layer is disposed on the current collector and has the diffusion-assisting structure.

19. The electrode for rechargeable batteries according to claim 18, wherein the current collector has an upper surface connected with the active material layer, and the active material layer fully covers the upper surface.

20. The electrode for rechargeable batteries according to claim 18, wherein the active material layer includes a conductive agent, the conductive agent includes carbon black, carbon nanotube, graphene, carbon fiber, or any combination thereof, and a concentration of the conductive agent is ranging from 0.5 wt % to 5 wt %.

* * * * *